United States Patent

Schulz et al.

[11] Patent Number: 5,921,494
[45] Date of Patent: Jul. 13, 1999

[54] PHOTOGRAPHIC FILM CARTRIDGE WITH FILM CLAMPING FLANGES

[75] Inventors: Willi Schulz, Grünwald; Josef Barth, Herrngiersdorf; Karl Modemann, Bonn, all of Germany

[73] Assignee: Agfa-Gevaert AG, Germany

[21] Appl. No.: 09/048,604

[22] Filed: Mar. 26, 1998

[30] Foreign Application Priority Data

Apr. 2, 1997 [DE] Germany .......................... 197 13 627

[51] Int. Cl.⁶ ................................................. G03B 23/02
[52] U.S. Cl. .................. 242/348; 242/348.3; 242/348.4; 242/588.5; 242/538.4; 396/512
[58] Field of Search ................................ 242/348, 348.3, 242/348.4, 588.5, 588.6, 538.4; 396/511, 512, 513, 514

[56] References Cited

U.S. PATENT DOCUMENTS

| | | |
|---|---|---|
| 4,846,418 | 7/1989 | Fairman . |
| 5,126,774 | 6/1992 | Loewe et al. . |
| 5,226,613 | 7/1993 | Kataoka et al. . |
| 5,271,577 | 12/1993 | Takahashi et al. . |
| 5,282,585 | 2/1994 | Takatori et al. . |
| 5,411,220 | 5/1995 | Kitagawa . |
| 5,477,299 | 12/1995 | Takahashi . |
| 5,622,755 | 4/1997 | Mizuno et al. . |

FOREIGN PATENT DOCUMENTS 195 39 026  4/1996  Germany .

*Primary Examiner*—Donald P. Walsh
*Assistant Examiner*—William A. Rivera
*Attorney, Agent, or Firm*—Connolly & Hutz

[57] ABSTRACT

A photographic film cartridge having a spool (1) which is rotatably mounted in a cartridge casing (3) and on which a film strip is wound in the form of a film roll (2), wherein the film can be moved out of the cartridge casing in the direction of unwinding by turning the spool, comprises (a) flanges on the spool, the face of which flanges which is oriented towards the film roll is at a distance from the film roll which becomes less from the inside (axis) to the outside (periphery), so that the film is clamped at the outermost periphery of the film roll, and (b) encircling ribs, which merely expose the region of the cartridge mouth, on the inside of the cartridge casing in the region of the edges of the film roll, which ribs prevent a radial expansion of the film roll.

2 Claims, 2 Drawing Sheets

PHOTOGRAPHIC FILM CARTRIDGE WITH FILM CLAMPING FLANGES

The present invention relates to a photographic film cartridge having a spool which is provided with flanges and around which a film strip is wound, particularly a film cartridge which is capable of automatically advancing a non-protruding film leader tip from a cartridge casing in the direction of unwinding in response to a rotation of the spool. The present invention relates in particular to a film cartridge, the spool flanges of which have an optimum elasticity, durability and film winding capacity.

Film cartridges have been proposed recently which can be actuated so that they can automatically advance a film leader from the cartridge casing when the film spool is turned in the direction of unwinding (U.S. Pat. No. 4 834 306, U.S. Pat. No. 4 832 275 and EP-A-0406 815). The film leader does not protrude, and is therefore located completely inside the cartridge casing, unless the film cartridge is loaded in a camera, a film inspection device or the like. This type of film cartridge can therefore be handled in a more practical and reliable manner, both by the user and by the developer.

The main parts of this type of film cartridge which comprises advance of the film leader, such as the cartridge casing, the spool and the flanges for instance, are produced by the injection moulding of plastics.

These flanges serve to wind the film firmly and in a close-fitting manner in a roll on the spool and to prevent the film roll from coming loose. The flanges are formed as discs with peripheral lips, for example. The lips cover the sides of the outermost winding of the film roll in order to delimit it radially, whilst the flanges delimit the film roll axially. When the film is ejected, frictional contact between the film roll and the casing parts is prevented by the peripheral lips.

A separating claw and confining ribs are formed inside the cartridge casing. The separating claw is suitable for receiving the film leader, namely the end of the outermost winding of the film roll, in the vicinity of the film passageway opening. The confining ribs confine the flanges towards the film roll, so that the flanges are held in contact with the end faces of the film roll. The confining ribs, which are opposite each other in the vicinity of the film passageway opening, are separated from each other by a distance which makes it possible for the flanges to release their delimitation of the film roll. The film strip can thus be unwound and can be advanced from the cartridge casing after the film leader has been lifted from the separating claw.

According to a more recent proposal (DE-A-195 39 026), these flanges are formed from a polymer mixture which contains a) a polystyrene, b) a polyphenylene ether and c) an elastomer, wherein the weight ratio of polystyrene to polyphenylene ether ranges from 60 to 40 to 10 to 90, the elastomer is used in an amount of 6 to 19% by weight with respect to the sum of polystyrene and polyphenylene ether, and the flanges are produced from the polymer mixture by thermoforming.

The production and use of these extremely thin-walled flanges are very susceptible to problems, firstly on account of the composition of the material and secondly on account of the thermoforming method.

In addition, these flanges have to be deflected to a very considerable extent when the film is pushed out (which is why a thin wall thickness and an elastic material are used). Due to the considerable deflection of the flanges, the torque for ejecting the film can be transmitted directly on to the outermost winding layer of the film roll, so that ejection of the film leader is accomplished with relatively few turns of the spool. However, the considerable deflection results in an increased film tension in the camera and thus results in a higher energy consumption and a shorter life of the battery situated in the camera.

The object of the present invention is to develop new types of flanges for the photographic film cartridge described above, which avoid the disadvantages outlined above.

This object is achieved (a) by providing flanges on the spool, the face of which flanges which is oriented towards the film roll is at a distance from the film roll which becomes less from the inside (axis) to the outside periphery), so that the outermost layer of the film roll is clamped and the torque for ejecting the film is transmitted to the outermost roll layer, and (1)) by providing encircling ribs, which merely expose the region of the cartridge mouth, on the inside of the cartridge casing in the region of the edges of the film roll, which ribs prevent a radial expansion of the film roll and reduce the frictional contact between the film roll and the casing parts to a minimum, preferably outside the active image region of the film.

The flanges are fashioned and mounted on th e spool so that the clamping action does in fact hold the film roll but doe s not con stitute an impediment when the film is first pushed outwards and is then pulled.

The film cartridge according to the invention can be produced consider ably more easily than the cartridge according to DE 195 39 026, because the flanges can be produced in one operation with the spool and the ribs can be produced in one operation with the cartridge casing, by injection moulding. The complicated polymer mixture for the flanges can be dispensed with, the flanges can have a greater wall thickness and can thereby have a greater stability. Thermoforming is unnecessary.

The Figures show designs of a photographic film cartridge according to the prior art and a form of construction according to the present invention.

Figure 1:
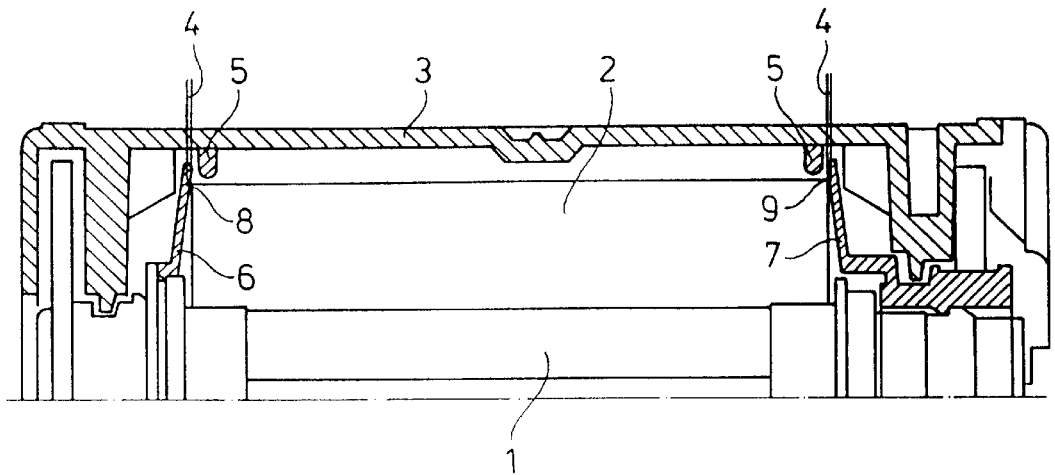
FIG. 1 is a partial longitudinal section through the interior of a film cartridge according to the invention.

FIG. 1 shows the spool 1 with the film roll 2, which is situated in a cartridge, the cartridge casing 3 of which is shown. The encircling ribs 5 can be seen on the cartridge casing. The flanges 6 and 7 clamp the film roll 2 at positions 8 and 9. In order to push the film out of the cartridge by turning the spool, the flanges 6 and 7 merely have to be deflected by the distance 4.

Figure 2:
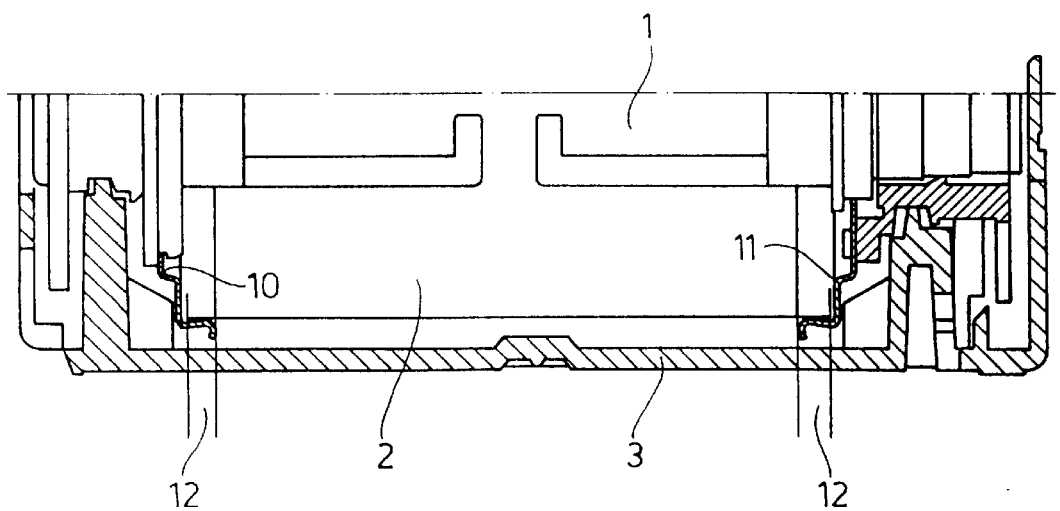
FIG. 2 is a corresponding longitudinal section through a film cartridge according to DE 195 39 026.

The conventional cartridge shown in FIG. 2 also comprises a spool 1, a film roll 2 and a cartridge casing 3. Flanges 10 and 11 which are produced by thermoforming are provided here. These have a complicated form, in order to hold the film roll 2 both axially and radially, and have to be deflected by a distance 12 which is much greater than 4 so that the film can be pushed out of the cartridge. The flanges 10 and 11 therefore have to be produced with very thin walls, which makes both their production and their use very susceptible to problems.

Figure 3:
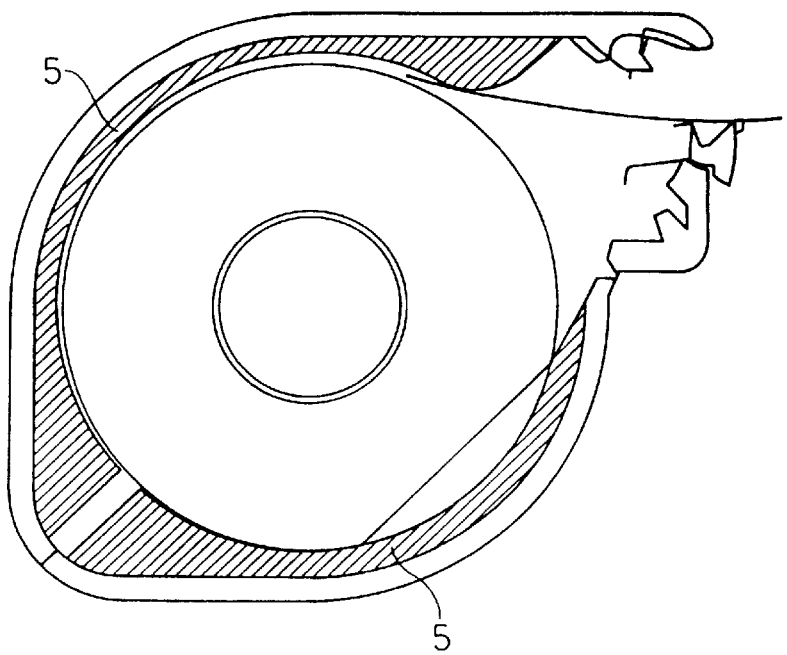
FIG. 3 and FIG. 4 are cross-sections through a film cartridge according to the invention.

It can be seen in addition from FIG. 3 that in a preferred embodiment the height of the ribs 5 as seen in the direction of film advance becomes continuously less towards the cartridge mouth. This makes it easier to push out the film, especially if the film leader is situated in an unfavourable position which is particularly remote from the cartridge mouth.

Figure 4:
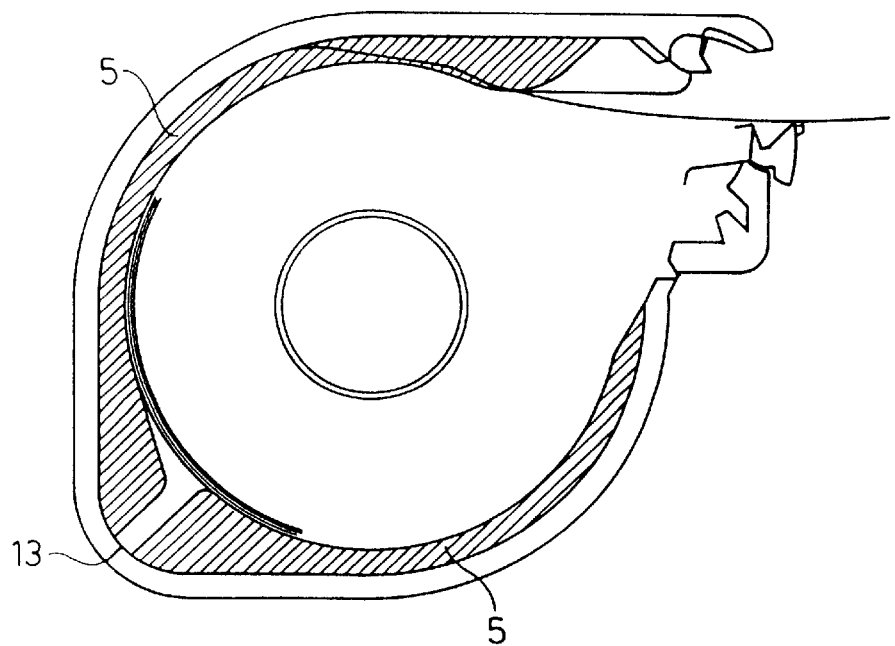

For the same reason, and as shown in FIG. 4, in position 13 which is opposite to the cartridge mouth, where the cartridge casing is assembled from two half shells and the ribs are therefore interrupted, the second part of the rib as seen in the direction of film advance can be considerably lower at its start.

In one preferred embodiment, the new flanges, which have a wall thickness of about 0.2 to 0.3 mm, are in fact somewhat thicker that previous flanges produced by thermoforming (~0.18 mm). Nevertheless, the unwinding forces are less on account of the considerably reduced deflection.

We claim:

1. A photographic film cartridge having a spool (1) rotatably mounted in a cartridge casing (3) and on which a film strip is wound in the form of a film roll (2), wherein the film can be moved out of the cartridge casing in the direction of unwinding by turning the spool, characterized in that (a) flanges are provided on the spool, the faces of which flanges which are oriented towards the film roll are at a distance from the film roll which becomes less from the inside to the outside, so that the film is clamped at the outermost periphery of the film roll, and (b) encircling ribs which expose the region of the cartridge mouth, are provided on the inside of the cartridge casing in the region of the edges of the film roll, which ribs prevent a radial expansion of the film roll, become effective outside the active image region of the film and have a height which as seen in the direction of the film advance becomes less towards the cartridge mouth.

2. A photographic film cartridge according to claim 1, wherein the encircling ribs are interrupted in a position opposite to the cartridge mouth and a second part of the ribs as seen in the direction of the film advance is lower at its start compared with the first part of the ribs.

* * * * *

UNITED STATES PATENT AND TRADEMARK OFFICE
CERTIFICATE OF CORRECTION

PATENT NO.: 5,921,494

DATED: JULY 13, 1999

INVENTOR(S): WILLI SCHULZ ET AL

It is certified that error appears in the above-identified patent and that said Letters Patent is hereby corrected as shown below:

Column 2, line 12, "periphery)" should read -- (periphery) --; line 15, "(1))" should read -- (b); line 22, "th e" should read -- the --; line 24 "doe s not con stitute" should read -- does not constitute --; and line 27, "consider ably" should read -- considerably --.

Column 4, line 1, delete "which".

Signed and Sealed this

Fourteenth Day of December, 1999

Attest:

Q. TODD DICKINSON

Attesting Officer

Acting Commissioner of Patents and Trademarks